United States Patent
Fabian et al.

(10) Patent No.: US 6,796,503 B1
(45) Date of Patent: Sep. 28, 2004

(54) METHODS AND APPARATUS FOR DYNAMIC ADJUSTMENT OF BAR CODE READER PARAMETERS

(75) Inventors: Kenneth Joseph Fabian, Grayson, GA (US); John B. Keys, Duluth, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/727,426

(22) Filed: Dec. 4, 2003

(51) Int. Cl.[7] .............................................. G06K 7/10
(52) U.S. Cl. ............................. 235/462.01; 235/462.38
(58) Field of Search ........................ 235/454, 462.01, 235/462.08, 462.25, 462.32, 462.36, 462.38, 462.45, 472.01

(56) References Cited

U.S. PATENT DOCUMENTS

| | | | | |
|---|---|---|---|---|
| 5,742,042 A | * | 4/1998 | Scofield | 235/462.36 |
| 5,910,651 A | * | 6/1999 | Ryvkin | 235/462.25 |
| 6,032,865 A | * | 3/2000 | Itoh et al. | 235/462.25 |
| 6,220,513 B1 | * | 4/2001 | Blanford et al. | 235/462.15 |
| 6,634,556 B2 | * | 10/2003 | Courtney et al. | 235/462.36 |

* cited by examiner

*Primary Examiner*—Thien M. Le
*Assistant Examiner*—April Taylor
(74) *Attorney, Agent, or Firm*—Priest & Goldstein, PLLC

(57) ABSTRACT

Systems and techniques for improved accuracy of bar code detection and decoding are described. A bar code scanner employs a rotating spinner to reflect a laser beam used to produce one or more scan patterns emerging from scan windows. The scanner produces a scanner signal in response to light entering the scan windows, and processes the scanner signal to detect and decode bar codes within a scan field of the scanner. The rotational position of the spinner is continuously monitored and adjustments to processing parameters are made and other actions are taken based on the rotational position of the spinner, so as to improve reliability and accuracy of bar code detection and processing.

15 Claims, 3 Drawing Sheets

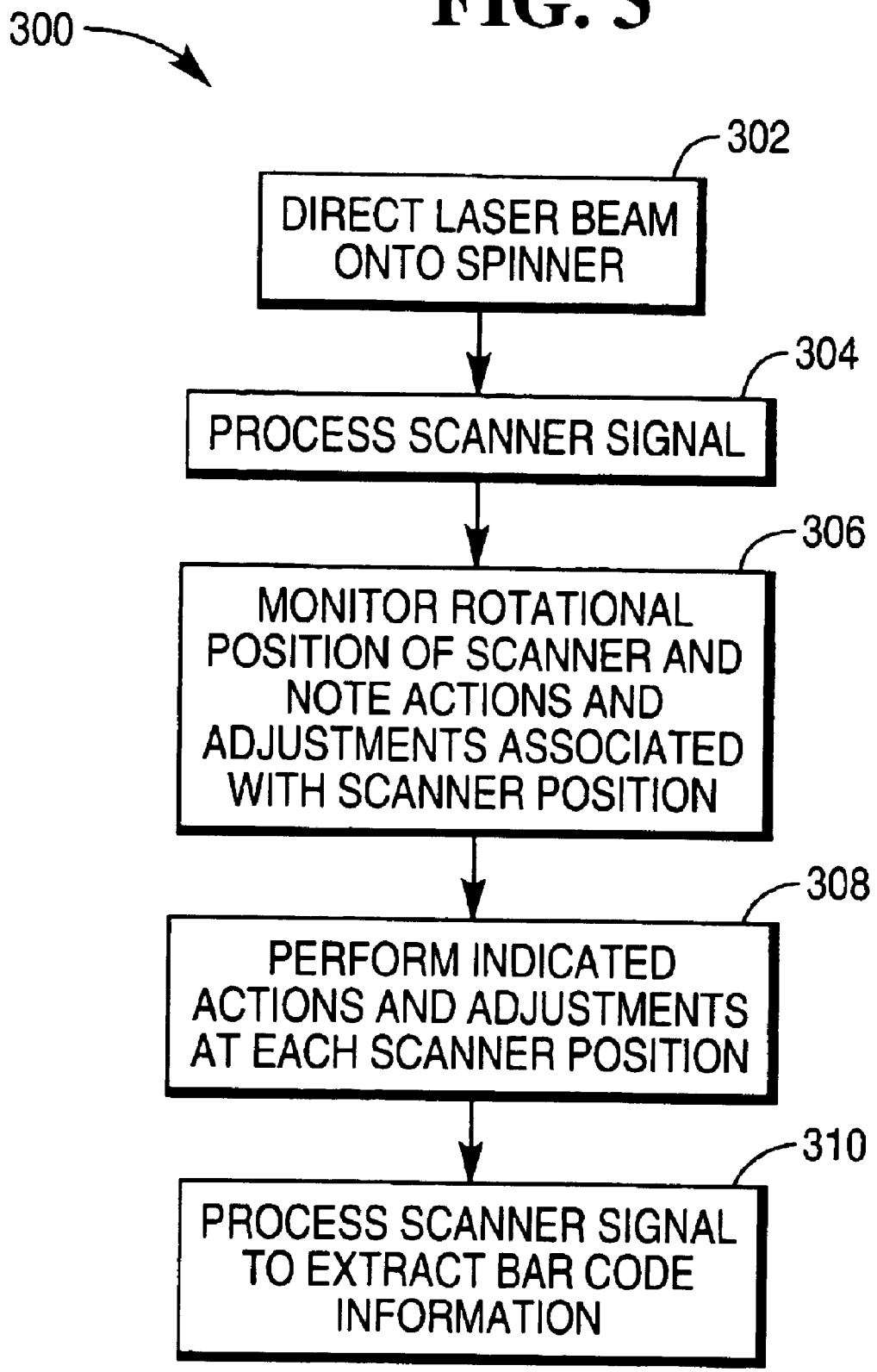

METHODS AND APPARATUS FOR DYNAMIC ADJUSTMENT OF BAR CODE READER PARAMETERS

FIELD OF THE INVENTION

The present invention relates generally to improvements to bar code scanners and bar code scanning. More particularly, the invention relates to advantageous systems and techniques for adapting the processing of a scan signal to variations in a scan beam whose reflections produce the scan signal.

BACKGROUND OF THE INVENTION

Bar code scanners operate by generating a scan pattern produced by reflections of a laser beam from a rotating polygonal spinner and from a series of fixed mirrors. A laser source emits the laser beam, which is directed to the spinner. The laser beam strikes the spinner and is reflected from the spinner to a series of fixed mirrors, to create a scan beam. The scan beam is directed to and out of a scan window of the scanner. As the spinner rotates, the angle at which the laser beam is reflected from the spinner changes. Typically, the scanner is designed so that this change in reflection angle causes the scan beam to move across the scan window, tracing out a scan line. In addition, the rotation of the spinner causes the laser beam to take different reflection paths, so that the scan beam traces out a set of scan lines comprising a scan pattern.

When a scan line is reflected from an object outside of the scanner, a portion of the light is frequently reflected back into the scanner through the scan window, where it is used to produce a scan signal that can be processed to detect and decode a bar code pattern.

Depending on the design of the scanner, scan patterns may be produced emerging from one, two or more scan windows. During generation of the scan pattern, the length of the path that the laser beam must travel to reach the scan window may change, and the laser beam may be reflected at different angles and from different sets of mirrors. These differing conditions relating to the reflection of the laser beam may cause the scan beam emerging from a scan window to exhibit differing characteristics. In addition, a scan beam may exhibit differing characteristics as it traces out a scan line. Such changes in characteristics may be caused, for example, by differing angles of the scan beam as it traces the line. For example, at the beginning and the end of a scan line, the scan beam may emerge from the scan window at an angle, while at the middle of a scan line, the scan beam is nearly perpendicular to the scan window.

The differing characteristics of the scan beam typically include differing intensities of scan lines and variations in intensity along the same scan line, resulting in differing intensities of light reflected back into the scan window. In addition, differing scan beam angles may result in more or less direct reflection of light back into the scan window, causing variations of the scan signal. Additional variations in the scan signal may result from other differences in the scan beam characteristics, as the scan pattern or patterns are traced out. Furthermore, in a multiple window scanner, the scan pattern emerging from one window may be more intense or have other characteristics that produce a stronger scan signal than does a scan pattern emerging from another window. These variations may cause difficulties in properly detecting and decoding bar codes, unless proper accommodation is made for such changes. In addition, at some points during the rotation of the spinner, the scan beam may be positioned such that any data it provides is unreliable. For example, the scan beam may strike an internal obstruction within the scanner. While the scan beam is striking the obstruction, the light reflected out of the scan window may be diffuse and unreliable for use in scanning.

SUMMARY OF THE INVENTION

In order to overcome these difficulties, a scanner designed according to the principles of the present invention takes advantage of available information relating to the angle of the spinner, and uses this information in setting scanner parameters. If the position of the spinner at a particular time is known, the laser beam path, scan beam intensity and other characteristics of the scan patterns emerging from the scan windows can be calculated. The required calculations are performed by taking into account the various placements and orientations of elements within the scanner, the properties of the laser beam used to produce the scan pattern and the optical properties and other characteristics of elements affecting the generation of the scan pattern. Once the relevant characteristics of the scan pattern are known, these characteristics can be taken into account in setting scanner parameters. For example, the collection efficiency provided by the scan beam tracing a scan line is often relatively low toward the ends of the scan line and higher toward the center of the scan line. The detection threshold used for bar code detection can be adjusted depending on the position of the scan beam in the scan line.

The position of the spinner is suitably determined using any of a number of techniques. For example, a Hall sensor may be implemented with a spinner motor, producing signals indicating the angular position of the spinner motor and thus of the spinner. Alternatively, the spinner position may be optically calibrated at various intervals, and a timer used to compute the angular position of the spinner. If the spinner rotates at a known speed, the position of the spinner can be calculated using the time elapsed since the spinner was in a known position. Other techniques for determining the angle of rotation of the spinner may be employed, and any technique providing sufficiently accurate information about the rotation angle may be used.

A more complete understanding of the present invention, as well as further features and advantages of the invention, will be apparent from the following Detailed Description and the accompanying drawings.

BRIEF DESCRIPTION OF THE DRAWINGS

FIG. 3 illustrates a process of bar code scanning according to an aspect of the present invention.

DETAILED DESCRIPTION

Figure 1:
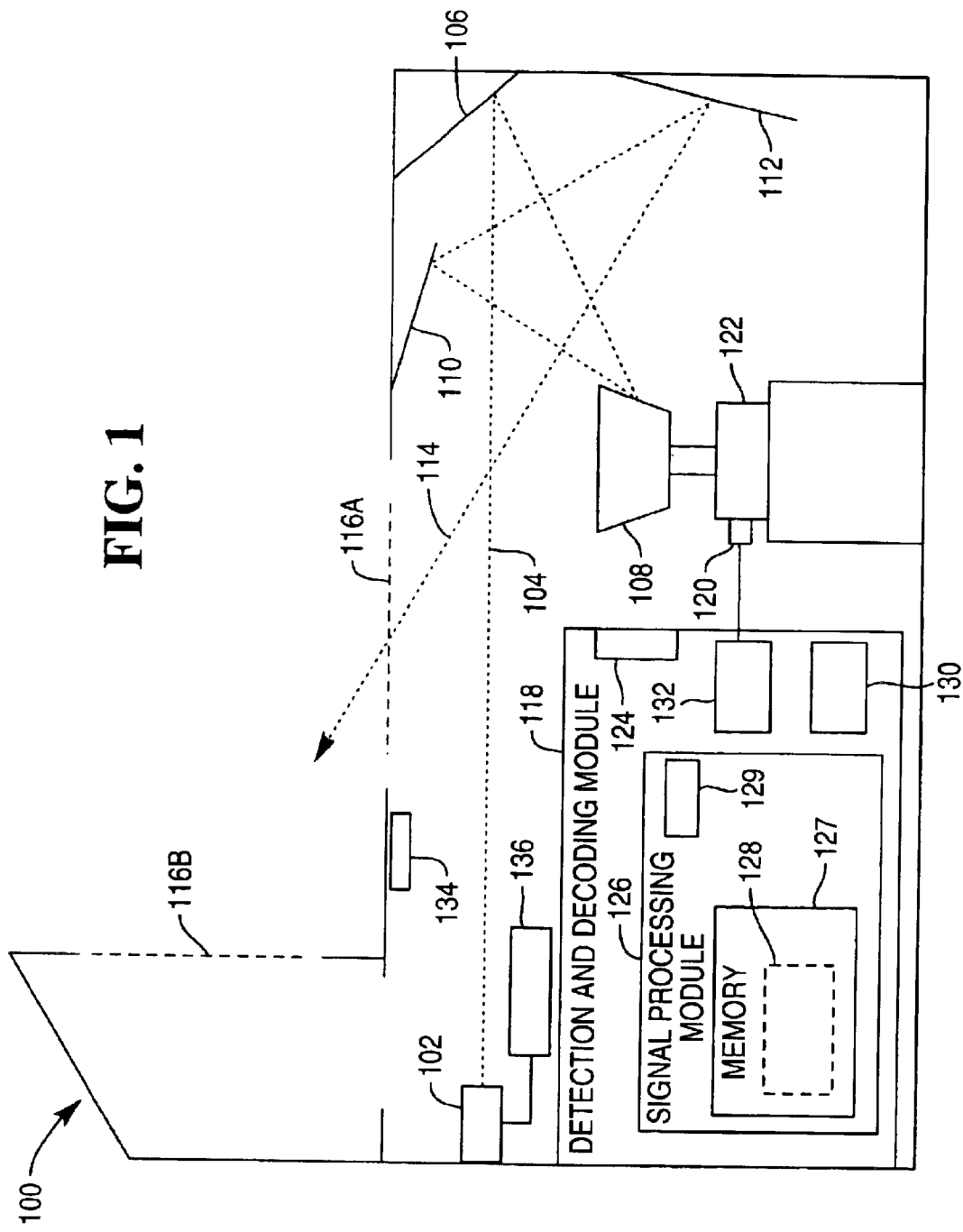
FIG. 1 illustrates a scanner according to an aspect of the present invention.

FIG. 1 illustrates a scanner 100 according to an aspect of the present invention. The scanner 100 includes a laser 102 emitting a laser beam 104. The laser beam 104 is directed to a deflector mirror 106 and is reflected to strike a rotating polygonal spinner 108. The scanner 100 includes a set of primary mirrors of which a primary mirror 110 is illustrated here, as well as a set of secondary mirrors of which a secondary mirror 112 is illustrated here. Once the laser beam 104 is reflected from the spinner 108, it is directed to one of the primary mirrors and from there to one of the secondary mirrors. Here, the laser beam 104 is shown as traveling from the spinner 108 to the primary mirror 110 and then to the secondary mirror 112. Once the laser beam 104 is reflected from a secondary mirror, it is conveniently called a scan beam 114, and is directed to and out of one of the scan windows 116A and 116B. As the spinner 108 rotates, the angle of reflection of the laser beam 104 from the spinner 108 changes, causing the laser beam 104 and the scan beam 114 to move. The rotation of the spinner 108 causes the scan beam 114 to move across the scan window from which it is emitted, causing it to trace out a scan line. In addition, the rotation of the spinner 108 and the change of the spinner facet from which the laser beam 104 is reflected causes the path traveled by the laser beam 104 to change, so that the laser beam 104 is reflected from different sets of primary and secondary mirrors, causing the position of the scan beam 114 to change so that it traces out different scan lines, and causing the scan beam 114 to be emitted from different ones of the scan windows 116A and 116B. During each rotation of the spinner 108, a scan pattern emerges from each of the scan windows 116A and 116B, each scan pattern being created through the tracing out of a plurality of scan lines emerging from the scan window.

During each rotation of the spinner 108, the laser beam 104 reflected from the spinner 108, and thus the scan beam 114 emerging from the scan windows 116A and 116B, undergoes changes. These changes include the angle at which the scan beam 114 emerges from the windows 116A and 116B and the effective intensity at which the scan beam 114 emerges from a scan window and is likely to strike an object in the scan field of the scanner 100. The changes to the scan beam 114 affect the detection and decoding of bar codes from which the scan beam 114 may be reflected. At some points in the rotation of the spinner 108, the scan beam 114 may have characteristics tending to promote easier detection and decoding, while at other points in the rotation of the spinner 108, the characteristics of the scan beam 114 may make detection and decoding more difficult. In addition, at some points in the rotation of the spinner 108, the laser beam 104 or the scan beam 114 may encounter obstructions that interfere with the usefulness of the scan beam 114 in bar code detection.

The scanner 100 includes a detection and decoding module 118 that receives light reflected into the scanner 100 and performs processing in order to determine whether the light represents a reflection of a bar code within the scan field, and to perform decoding to extract bar code information from the reflected light. The detection and decoding module 118 employs information relating to the position of the spinner 108, in order to compensate for variations in the reflected laser beam 104 and the scan beam 114, occurring during the rotation of the spinner 108. This information may be received from a sensor, such as a Hall sensor 120, connected to a motor 122 used to rotate the spinner 108. The information from the Hall sensor 120 may suitably be examined to determine when the spinner 108 is in a predetermined reference position and then timing information may be used to determine the position of the spinner 108 throughout its rotation. If the spinner 108 has a known rate of rotation, the position of the spinner 108 can be determined by using the timing information to determine the displacement of the spinner 108 from the position indicated by the Hall sensor 120. If the Hall sensor 120 can identify the position of the spinner 108 with sufficient precision, the information provided by the Hall sensor 120 can be used to determine the position of the spinner 108 throughout its rotation. Alternative techniques may be used to determine when the spinner 108 is in a reference position. For example, a synchronization label may be read to determine a reference position of the spinner 108 and then timing information can be utilized to determine the displacement of the spinner from the reference position in a known manner. Details of such use of a synchronization label are disclosed in Blanford U.S. Pat. No. 6,220,513 and Blanford U.S. Pat. No. 6,347,741, assigned to a common assignee with the present invention and incorporated herein by reference in their entirety. Alternatively, a scanner may employ a diffractive element to diffract a laser beam reflected from a spinner such as the spinner 108 when the spinner is in a reference position, such that the diffracted beam strikes a reference position photodetector to produce a reference position photosignal used to calibrate the position of the spinner. Details of such determination of a spinner position using a photosignal produced by a diffracted beam are disclosed in Belknap U.S. Pat. No. 6,454,169, assigned to a common assignee with the present invention and incorporated herein by reference in its entirety.

The module 118 suitably includes a photodetector 124. The photodetector 124 produces an electrical signal, suitably referred to as a scanner signal, when struck by light. The scanner signal is processed by a signal processing module 126, in order to determine if the signal represents a reflection from a bar code and to extract bar code information from the signal.

The signal processing module receives information indicating the rotational position of the spinner 108, in order to compensate for variations in the scanner signal caused by the rotation of the spinner 108. The intensity, for example, of the scan beam 114 may change due to changes in the rotational position of the spinner 108, and the scanner signal will reflect these changes in intensity.

In order to identify transitions in a bar code, the signal processing module 126 suitably identifies crossings of a threshold by the scanner signal. In order to avoid mistaking changes in the scanner signal that are caused by scan beam variations due to changes in position of the spinner 108 from those caused by motion of the scan beam 114 from light to dark areas of the bar code, the signal processing module 126 suitably takes the position of the spinner 108 into account when setting the threshold. The characteristics of the scan beam 114 at each position of the spinner 108 can be determined from the design of the scanner 100, and appropriate adjustments to the threshold for each position of the spinner 108 can be computed and stored. Suitably, the signal processing module 126 includes memory 127 storing an adjustment table 128. The adjustment table 128 includes an entry for each rotational position of the spinner 108 at which a change in threshold or other adjustment occurs. Each entry includes the rotational position of the spinner 108, and a threshold value to be set or other action to be taken when the specified spinner position is reached. A partial example of the entries in an adjustment table such as the table 128 is shown below. In order to avoid unnecessary detail and duplication, the example shown below employs a lower resolution than would be used in an actual table used in processing. An actual table such as the table 128 might include thousands of entries, because the resolution used to describe the position of the spinner 108 could be very fine. In addition, entries are shown in the table below for only one scan line, but an actual table such as the table 128 would include entries for every scan line in all scan patterns used in a scanner such as the scanner 100.

The exemplary values shown here include a sequence of rotational positions, expressed in terms of ten-thousandths of a complete revolution. Each rotational position listed in the table has an associated threshold value to be set or other action to be taken in addition to or instead of setting a threshold value. The threshold values are expressed here in terms of fractions of a volt.

| ANGLE_ COUNT[15:0] | ACTION | COMMENT |
| --- | --- | --- |
| 0 | DC_THRESHOLD = 0.250 | Default |
| 57 | DC_THRESHOLD = 0.125 | Horizontal Window |
| 219 | Video_off | Mirror edge |
| 224 | Video_on, Long_focus_laser_on | |
| 1991 | DC_THRESHOLD = 0.250 | Vertical_window |
| 2123 | DC_THRESHOLD = 0.500 | Raise threshold to prevent belt read |
| 3333 | DC_THRESHOLD = 0.250, Short_focus | Vertical window |
| 3995 | DC_THRESHOLD = 0.100 | Start of Line V7 (low collection efficiency) |
| 4000 | DC_THRESHOLD = 0.120 | |
| 4005 | DC_THRESHOLD = 0.140 | |
| 4010 | DC_THRESHOLD = 0.150 | |
| 4015 | DC_THRESHOLD = 0.160 | Center of Line V7 (high collection efficiency) |
| 4020 | DC_THRESHOLD = 0.150 | |
| 4025 | DC_THRESHOLD = 0.140 | |
| 4030 | DC_THRESHOLD = 0.120 | |
| 4035 | DC_THRESHOLD = 0.100 | |
| 9860 | End of Table | |

As the spinner 108 rotates, the signal processing module 126 receives rotational position information from the sensor 122. The signal processing module 126 monitors the rotational position of the spinner 108. As the spinner 108 reaches each rotational position included in the table 128, a processing element 129 employed by the signal processing module 126 makes the adjustment associated with that position of the spinner 108. The processing element 129 processes the scanner signal using the threshold values obtained by consulting the adjustment table 128. In addition to adjusting the threshold to adapt it to variations in the scanner signal, the processing element 129 may block processing of the scanner signal at particular positions of the spinner 108. For example, during the transition of the scan beam from the scan window 116A to 116B, processing may be blocked. In addition, the signal processing module 126 may suitably adjust the threshold to a high level in order to inhibit detection when it is known that the scan signal 114 is obstructed, for example by objects within the scanner, or when the position of the spinner 108 is otherwise such that detection and decoding is unreliable when the spinner 108 is in that position. The table above provides a list of scanner positions and associated threshold values to be set and actions taken at each position. Signal processing is inhibited during the transition from the vertical window 116A to the horizontal window 116B, and the threshold is raised to a high level at other positions in order to prevent a belt read. A belt read is an inadvertent reading of a bar code of an item that is not in position at one of the scanner windows 116A or 116B, but instead is some distance away from the scanner window, for example positioned on a conveyor belt approaching the horizontal window 116B. Unless appropriate measures are taken, inadvertent reading of a bar code is possible if the scan beam 114 emerges from the horizontal window 116B at a low angle of incidence to the surface of the scanner 100 and strikes a bar code on an object that is located on the conveyor belt. Adjusting the threshold to a high level when the scan beam 114 emerges from the window 116B at such a low angle of incidence helps to reduce or eliminate the likelihood of such inadvertent reading. At other rotational positions of the spinner 108, the threshold is adjusted in order to compensate for changes in collection efficiency resulting from changes in the emitted scan beam 114.

As illustrated here, a sensor 120 is used to obtain rotational position information, either to identify a reference position of the spinner 108 or simply to provide the rotational position of the spinner 108. If the sensor 120 is used to identify the reference position, the rotational position of the spinner 108 may be determined by using timing information provided by a clock module 130. The clock module 130 monitors the elapsed time since the spinner 108 was in the reference position and the position is then computed using a position computation module 132.

In addition, alternative techniques exist for determining a reference position of the spinner 108. For example, calibration of the position of the spinner 108 may be periodically performed. For example, a synchronization label 134 may be positioned within the scanner such that the synchronization label 134 will be scanned when the spinner is in a predefined position. The synchronization label 134 may suitably be positioned such that it is scanned once in each rotation of the spinner 108.

In addition to setting parameters used by the detection and decoding module 118 using the rotational position of the spinner 108, it is also possible to set parameters of other elements of the scanner 100. For example, the position information may be supplied to a laser control module 136 for use in setting the power of the laser 102. Other parameters that may be adjusted include the focal point of the laser beam 104. A suitably designed scanner such as the scanner 100 can be adapted to use positional information to adjust any parameter that can improve scanning performance if adjusted for the position of the spinner 108.

Figure 2:
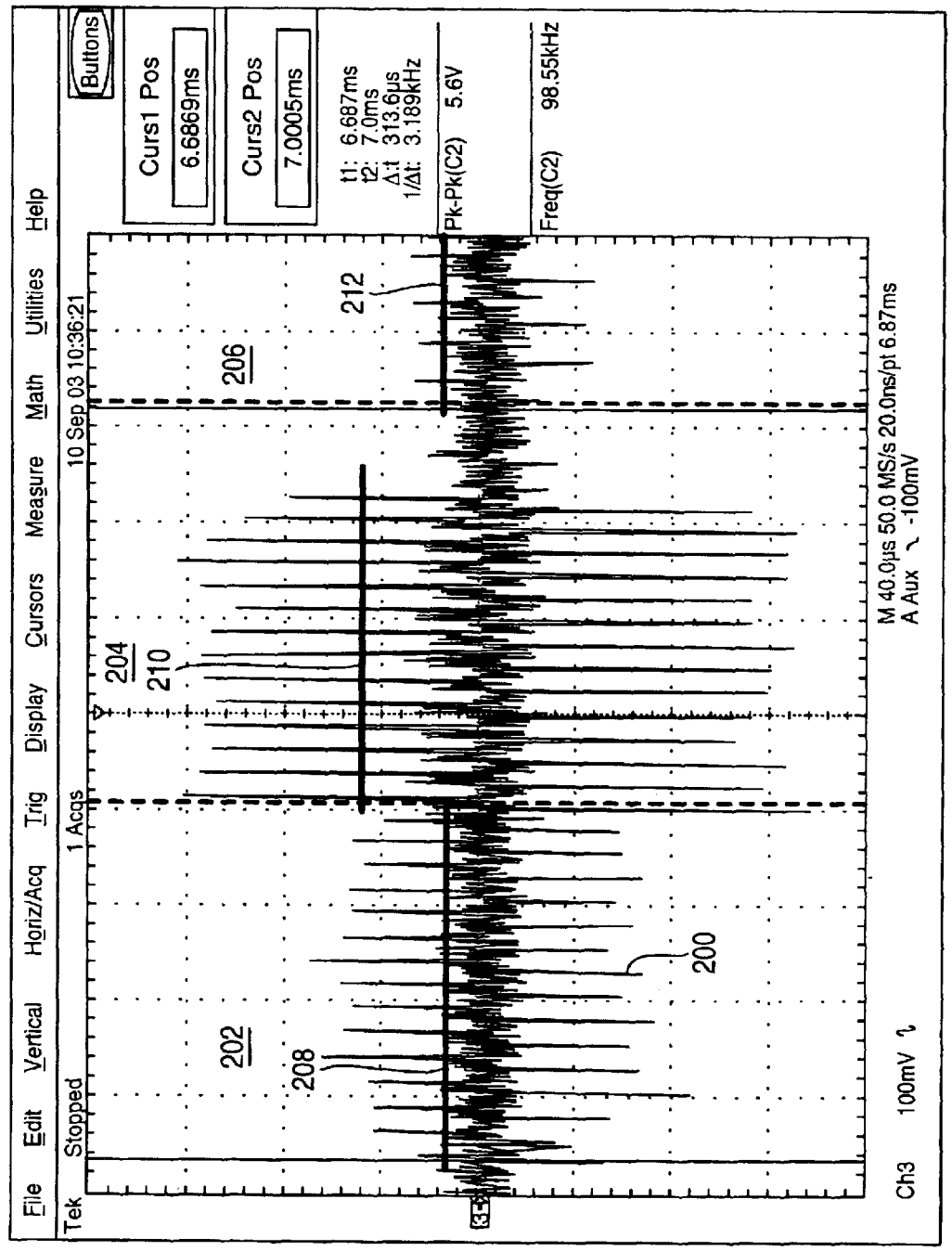
FIG. 2 illustrates a graph showing a scanner signal and threshold levels that may suitably be adjusted to improve processing of the scanner signal.

FIG. 2 illustrates an exemplary scanner signal 200, showing changing characteristics of the signal 200 as a result of changes in the characteristics of and conditions encountered by a scan beam used to scan a bar code in order to produce the signal. The signal 200 results from a scan of a bar code especially designed to illustrate scanner operation. The bar code producing the signal is a 100 mil zebra pattern, that is, a pattern comprising equally spaced alternating black and white regions, placed directly on a scan window of a scanner. The scanner signal may conveniently be divided into three regions 202, 204 and 206 in order to show changes undergone by the scan beam as it passed from the left to the right of the bar code. At the left side of the bar code, a piece of highly durable but dark glass was placed on the scan window. The light attenuation produced by this dark glass illustrates the attenuation produced by the horizontal window of a dual window scanner, and the effects on the region 202 of the scanner signal 200 are similar to the effects on a scanner signal produced by reflections of a scan beam out of and back into a horizontal scan window. The glass is not present in the areas of the bar code represented by the regions 204 and 206 of the signal 200, but the regions 204 and 206 differ significantly. The region 204 represents the central area of the scan line used to illuminate the bar code and the region 206 represents the signal from an adjacent scan line. In the central area region 204, the scan beam emerges from the scan window more directly than in the right area region 206, and the collection efficiency of the scan beam is higher in region 204 than in region 206.

In order to compensate for these variations in the scanner signal, a scanner such as the scanner 100 can be programmed to adjust the threshold used for processing the scan signal 200. The scanner sets three separate threshold values 208, 210 and 212, one for each of the regions 202, 204 and 206. The adjustments are made based on rotational position information for the spinner used by the scanner. The threshold value 210 is relatively high in order to allow proper processing of the higher peaks and higher noise levels in the region 204. The threshold value 208 is set by taking into account the lower illumination levels resulting from the attenuation presented by the dark glass. In other applications, such as a dual window scanner, a threshold value similar to the value 208 may be set when the spinner is in such a position that the scan beam will emerge from a horizontal scan window or other scan window emitting a lower level of illumination. The threshold value 212 is also relatively low, taking into account the lower illumination provided by the scan beam when it is near the right of the scan line and therefore emerges from the scan window at an angle.

FIG. 3 illustrates a process 300 of bar code scanning according to the present invention. At step 302, a laser beam is directed from a laser onto a rotating spinner. The spinner reflects the laser beam to the first of a sequence of fixed mirrors, reflected laser beam is reflected from the first mirror to subsequent mirrors in the sequence to create a scan beam that is reflected from the last mirror in the sequence and out of a scan window. The motion of the spinner causes the laser beam to move across the fixed mirrors, causing the scan beam to trace across the scan window, creating a scan line. In addition, the motion of the spinner causes the laser beam to be reflected through different sequences of fixed mirrors so as to trace out a plurality of scan lines forming one or more scan patterns. At step 304, a scanner signal resulting from the entry of light into the scanner is continuously processed in order to detect and decode bar code information resulting from the reflection of light from a bar code within the field of view of the scanner.

At step 306, the rotational position of the spinner is continuously monitored and compared against a table showing adjustments to be made and actions to be taken at predetermined spinner positions. The adjustments take into account the effect of the position of the spinner on scanner performance, and are chosen to improve the scanner performance at the designated position. At step 308, the indicated adjustments or actions are performed whenever the spinner reaches a position indicated in the table. At step 310, whenever the scanner signal reflects the presence of a bar code in the scan field of the scanner, the signal is processed to extract bar code information.

While the present invention is disclosed in the context of a presently preferred embodiment, it will be recognized that a wide variety of implementations may be employed by persons of ordinary skill in the art consistent with the above discussion and the claims which follow below.

We claim:

1. A bar code scanner comprising:
   a laser source for emitting a laser beam;
   a rotating spinner for reflecting the laser beam, the rotating spinner being placed and configured such that when the laser beam is reflected from the spinner and to and out of a scan window, the rotation of the spinner will direct the laser beam such that the laser beam sweeps across the scan window to form a scan line;
   a spinner position module for computing a rotational position of the spinner; and
   a bar code detection and processing module for processing a scanner signal generated by light entering a scan window of the scanner, the bar code detection and processing module receiving rotational position information indicating the rotational position of the spinner and using the rotational position information to adjust parameters used in processing the scanner signal.

2. The scanner of claim 1, wherein the spinner position module determines the rotational position of the spinner by identifying a time when the spinner is in a reference position and using timing information to compute the displacement of the spinner from the reference position.

3. The scanner of claim 2, wherein the bar code detection and processing module uses spinner position information to adjust threshold levels used to process the scanner signal.

4. The scanner of claim 3, wherein the bar code detection and processing module sets threshold levels so as to inhibit processing of the scanner signal when the position of the spinner is such that the information provided by the scanner signal is unreliable.

5. The scanner of claim 4, further including a laser control module for receiving spinner position information and using the spinner position information to adjust parameters of the operation of the laser source.

6. The scanner of claim 5, wherein the reference position of the spinner is determined by a sensor.

7. The scanner of claim 5, wherein the reference position of the spinner is determined by the reading of a synchronization label.

8. A method of bar code detection and decoding, comprising the steps of:
   directing a laser beam from a laser onto a rotating spinner and reflecting the laser beam from the spinner to a sequence of mirrors to create one or more scan patterns, each scan pattern comprising a set of scan lines emerging from a scan window;
   continuously processing a scanner signal resulting from the entry of light into the scanner in order to detect and decode bar code information resulting from the reflection of light from a bar code within the field of view of the scanner;
   identifying adjustments to be made and actions to be taken at predetermined positions of the rotational spinner;
   continuously monitoring the rotational position of the spinner;
   whenever the spinner reaches a predetermined position at which an adjustment is to be made or an action is to be taken, making the adjustment or taking the action associated with the predetermined position; and
   whenever the scanner signal reflects the presence of a bar code in a scan field of the scanner, processing the signal to extract bar code information.

9. The method of claim 8, wherein the adjustments include setting a threshold used in processing the scanner signal, the threshold being set based on the rotational position of the spinner.

10. The method of claim 9, wherein the step of monitoring the rotational position of the spinner includes noting the time at which the spinner reaches a reference position and using timing information to identify the displacement of the spinner from the reference position.

11. The method of claim 10, wherein the actions to be taken include inhibiting processing of the scanner signal when the spinner position is such that barcode detection and decoding would be unreliable.

12. The method of claim 11, wherein the actions to be taken include setting a power level of the laser bean, the power level being set based on the spinner position.

13. The method of claim 12, wherein the actions to be taken include adjusting a focal point of the laser based on the spinner position.

14. The method of claim 10, wherein the spinner is detected to be in the reference position by a sensor.

15. The method of claim 10, wherein the spinner is detected to be in the reference position by the reading of a synchronization label.

* * * * *